United States Patent
Hundeshagen et al.

(10) Patent No.: US 11,767,936 B2
(45) Date of Patent: *Sep. 26, 2023

(54) PIPE CONNECTION

(71) Applicant: REHAU CONSTRUCTION LLC, Leesburg, VA (US)

(72) Inventors: Dörte Hundeshagen, Bubenreuth (DE); Thomas Schaaf, Höchstadt a.d. Aisch (DE); Hansi Homburg, Höchstadt a.d. Aisch (DE); Oliver Vocks, Fürth (DE); Andreas Kirchberger, Herzogenaurach (DE)

(73) Assignee: REHAU CONSTRUCTION LLC, Leesburg, VA (US)

( * ) Notice: Subject to any disclaimer, the term of this patent is extended or adjusted under 35 U.S.C. 154(b) by 1190 days.

This patent is subject to a terminal disclaimer.

(21) Appl. No.: 16/063,876

(22) PCT Filed: Dec. 19, 2016

(86) PCT No.: PCT/EP2016/002131
§ 371 (c)(1),
(2) Date: Jun. 19, 2018

(87) PCT Pub. No.: WO2017/108170
PCT Pub. Date: Jun. 29, 2017

(65) Prior Publication Data
US 2018/0372249 A1      Dec. 27, 2018

(30) Foreign Application Priority Data
Dec. 21, 2015   (DE) .................... 20 2015 106 955.3

(51) Int. Cl.
*F16L 13/14*   (2006.01)
*F16L 33/22*   (2006.01)
*F16L 47/22*   (2006.01)

(52) U.S. Cl.
CPC .......... *F16L 13/146* (2013.01); *F16L 33/225* (2013.01); *F16L 47/22* (2013.01)

(58) Field of Classification Search
CPC ........ F16L 13/146; F16L 33/225; F16L 47/22
See application file for complete search history.

(56) References Cited

U.S. PATENT DOCUMENTS 3,262,721 A * 7/1966 Knight .................. F16L 33/227
                                                           285/148.14
3,833,246 A * 9/1974 Wake .................... F16L 33/223
                                                           285/259

(Continued)

FOREIGN PATENT DOCUMENTS

DE      9402909 U1      8/1994
DE      29822053 U1     4/2000

(Continued)

OTHER PUBLICATIONS

International Search Report for PCT/EP2016/002131, dated Feb. 22, 2017; English Translation submitted herewith (11 pages).

(Continued)

*Primary Examiner* — James M Hewitt, II
(74) *Attorney, Agent, or Firm* — FITCH, EVEN, TABIN & FLANNERY, LLP (57) ABSTRACT

A pipe connection includes at least one end of a plastic pipe or a metal plastic composite pipe and one connecting element with at least one support body provided with circumferential ribs, onto which the end of the pipe is slid. For the expansion ratio R(exp) of the pipe connection, the following applies:

$$0.05 < R(exp) = [D(max)/D(internal)] - 1 < 0.35$$

(Continued)

wherein D(max) stands for the maximum external diameter of the circumferential ribs and D(internal) for the internal diameter of the pipe.

27 Claims, 2 Drawing Sheets

(56) References Cited

U.S. PATENT DOCUMENTS

| | | | | |
|---|---|---|---|---|
| 4,198,079 | A * | 4/1980 | Shah | F16L 33/24 |
| | | | | 285/259 |
| 4,635,972 | A * | 1/1987 | Lyall | F16L 31/00 |
| | | | | 285/242 |
| 5,181,752 | A * | 1/1993 | Benson | F16L 13/146 |
| | | | | 285/328 |
| 5,853,202 | A * | 12/1998 | Li | F16L 33/30 |
| | | | | 285/256 |
| 6,231,085 | B1 * | 5/2001 | Olson | F16L 33/225 |
| | | | | 285/148.19 |
| 6,308,992 | B1 * | 10/2001 | Mitsui | F16L 33/30 |
| | | | | 285/133.11 |
| 11,541,581 | B2 * | 1/2023 | Runyan | B29C 45/0025 |
| 2006/0138770 | A1 * | 6/2006 | Miyajima | F16L 33/30 |
| | | | | 285/239 |
| 2007/0200339 | A1 * | 8/2007 | Yagisawa | F16L 33/30 |
| | | | | 285/33 |
| 2011/0109084 | A1 | 5/2011 | Bonhag et al. | |
| 2011/0239674 | A1 * | 10/2011 | Defilippi | F16L 33/30 |
| | | | | 285/345 |
| 2012/0037244 | A1 | 2/2012 | Ostrowiecki | |
| 2013/0025730 | A1 | 1/2013 | Roder et al. | |
| 2015/0362109 | A1 * | 12/2015 | Buchanan | F16L 33/22 |
| | | | | 285/399 |

FOREIGN PATENT DOCUMENTS

| | | |
|---|---|---|
| DE | 10047757 A1 | 5/2001 |
| DE | 202004011236 U1 | 9/2004 |
| DE | 102005007217 B3 | 5/2006 |
| DE | 202007015991 U1 | 3/2009 |
| DE | 102010015022 A1 | 10/2011 |
| EP | 0204445 A1 | 12/1986 |
| EP | 1342944 A1 | 9/2003 |
| EP | 2304300 A1 | 4/2011 |
| ES | 2302653 A1 | 7/2008 |
| FR | 1158934 A | 6/1958 |
| JP | H08326974 A | 12/1996 |
| WO | 92/00483 A1 | 1/1992 |
| WO | 2015/191991 A1 | 12/2015 |

OTHER PUBLICATIONS

Office action in Canadian App. No. 3,009,479 dated Jan. 17, 2020.
Office action in counterpart application CA 3,009,479 dated Apr. 24, 2019.
ASTM International, Designation F2080-16, Standard Specification for Cold-Expansion Fittings with Metal Compression-Sleeves for Crosslinked Polyethylene (PEX) Pipe and SDR9 Polyethylene of Raised Temperature (PE-RT) Pipe, pp. 1-8, Jan. 5, 2017 (Current edition approved Aug. 1, 2016. Published Sep. 2016. Originally approved in 2001. Last previous edition approved in 2015 as F2080-15a. DOI: 10.1520/F2080-16).
International Search Report dated Feb. 22, 2017 in PCT/EP2016/002131, filed Dec. 19, 2016.
Office action dated May 12, 2022 in Mexican App. No. MX/a/2018/007647.

* cited by examiner

PIPE CONNECTION

CROSS-REFERENCE TO RELATED APPLICATIONS

This application is a U.S. national phase application filed under 35 U.S.C. § 371 of International Application No. PCT/EP2016/002131, filed Dec. 19, 2016, designating the United States, which claims priority from German Patent Application No. 20 2015 106 955.3 filed Dec. 21, 2015, which are hereby incorporated herein by reference in their entirety.

BACKGROUND OF THE INVENTION

The present invention relates to a pipe connection, which comprises at least one end of a plastic pipe or metal plastic composite pipe and one connecting element with at least one support body provided with circumferential ribs onto which the end of the pipe is slid.

Such pipe connections are known in the prior art. In addition to at least one end of an all-plastic pipe or of a plastic composite pipe, such a pipe connection comprises a connecting element with at least one support body having circumferential external ribs, onto which the end of the pipe is slid. The end of the pipe is fixed to the connecting element via a fixing sleeve arranged over the end of the pipe, through which the end of the pipe is pressed against the external contour of the support body provided with circumferential external ribs. Depending on how the fixing sleeve used is attached, a distinction is made between various types of connecting techniques. Axial press-fitting systems, in which the support body is inserted into an expanded end of a pipe and a sliding sleeve attached externally to the end of the pipe is press-fitted in an axial direction onto the end of the pipe with inserted support body of the connecting element by means of a specific sliding tool, as well as radial press-fit systems, in which after inserting the support body of the connecting element into an expanded end of a pipe and a pressing sleeve is pressed in an axial direction onto the end of the pipe with inserted support body of the connecting element by means of a specific tool, shall be mentioned as examples for such connecting techniques. Such a radial press-fit systems is described in DE 298 22 053 U1, for example. In order to comply with regionally specific and application specific standards for the installation and the operation of such connecting systems, also different pipe wall thicknesses are used, while using the same external diameter of the pipe, in addition to the use of different pipe materials. For example, metric pipe dimensions are normalized according to DIN EN ISO 15875 for crosslinked polyethylene as the pipe material and are classified into different pipe series depending on their wall thicknesses. Moreover, inch-based external pipe diameters and wall thicknesses are normalized in ASTM F876, for example. The ratio of the external diameter to the wall thickness (Standard Dimension Ratio or SDR) is usually applied for a merely geometric classification of plastic pipes and metal plastic composite pipes. The regionally specific and application specific standards involve different pipe wall thicknesses, so that connecting elements, also referred to as fittings, having an adjusted external diameter become necessary with the result that a specific fitting selection and tool selection becomes necessary for each pipe series. This results in an extensive stock keeping for the plumber and a high danger of confusion when selecting the fittings.

SUMMARY OF THE INVENTION

Therefore, it is the object of the present invention to provide a pipe connection with a connecting element that overcomes the disadvantages of the prior art. In particular, the pipe connection according to the present invention shall comprise a universally employable connecting element, which can be used universally for different pipe wall thicknesses of the standards at a given external diameter, optionally in combination with different sliding sleeves. By this, the number of fittings to be stockpiled by the plumber shall be reduced and the danger of confusion when selecting the fittings shall be reduced as well.

These and other objects of the present invention are solved by a pipe connection having the features of claim 1. Preferred embodiments of the pipe connection according to the present invention are described in the dependent claims.

According to the present invention, it has been found that a pipe connection which leads to a tight and stable pipe connection for all pipes having the same external diameter, can be achieved by a suitable selection of the external diameter of the support body of the connecting element. This equally applies for the use of plastic pipes and metal plastic composite pipes. For the present invention, the external diameter of the support body of the connecting element is characterized by the so-called expansion ration $R(exp)=[D(max)/D(internal)]-1$, wherein $D(max)$ stands for the maximum external diameter of the circumferential external ribs and $D(internal)$ for the internal diameter of the pipe. According to the present invention the expansion ratio $R(exp)$ is within a range of 0.05 to 0.35. An expansion ratio within this range is high enough to provide a sufficient tightness of the connection when using plastic pipes. Moreover, when using metal plastic composite pipes, the expansion ratio is sufficiently low to prevent a damage of the metal layer of the metal plastic composite pipe due to a too strong local strain.

Accordingly, the present invention provides a pipe connection, which comprises at least one end of a plastic pipe or metal plastic composite pipe and one connecting element with at least one support body provided with circumferential ribs onto which the end of the pipe is slid, wherein the following applies to the expansion ratio $R(exp)$ of the pipe connection:

$$0.05 < R(exp) = [D(max)/D(internal)] - 1 < 0.35$$

wherein $D(max)$ stands for the maximum external diameter of the circumferential external ribs and $D(internal)$ for the internal diameter of the pipe.

The term "length of the support body", as used herein, means the distance between an open end of a support body of the connecting element and the edge of the circumferential collar facing the open end. Furthermore, the term "external diameter of the base area of the support body", as used herein, means the double distance between a longitudinal axis of a support body of the connecting element and the deepest point of the relevant support body between the pre-stop and the circumferential external rib adjacent to the latter.

According to the present invention, it is advantageous if, when using a plastic pipe, the expansion ratio $R(exp)$ of the pipe connection according to the present invention ranges from 0.10 to 0.35, particularly preferably from 0.15 to 0.25. A sufficiently tight pipe connection is achieved if the expansion ratio of the pipe connection according to the invention is within this range when using a plastic pipe, wherein no excessive effort is required when expanding the pipe.

When using a metal-plastic composite pipe, it has proved favourable with regard to an improved tightness of the pipe connection according to the invention and an integrity of the metal layer contained in the pipe if the expansion ratio R(exp) of the pipe connection ranges from 0.05 to 0.25 and particularly preferred from 0.10 to 0.20.

Furthermore, it can be useful if at least one of the circumferential external ribs of the support body has a saw tooth-like cross section and at least one of the circumferential external ribs has a substantially rectangular cross section. The presence of a rectangular sealing rib contributes to a secure sealing between the pipe and the connecting element in the pipe connection according to the invention, while a saw tooth-shaped circumferential external rib in the pipe connection according to the invention effectively prevents the end of the pipe slipping off from the support body of the connecting element. It is especially preferred in this context if at least one saw-tooth-shaped circumferential rib, in particular all saw-tooth-shaped circumferential ribs are arranged in such a way that the inclined side of the saw tooth points in the direction of the open end of the support body. The support body, beginning at the open end thereof, preferably has two circumferential external ribs with saw-tooth-like cross sections and a circumferential external rib with rectangular cross section. In alternative embodiments the support body, also beginning at the open end thereof, can also have a circumferential external rib with saw-tooth-like cross-section, two circumferential external ribs with rectangular cross section and again a circumferential external rib with saw-tooth-like cross section.

It has also proven to be favourable if the external diameter of each independent circumferential external rib equals 1.03 times to 1.3 times the external diameter of the base area of the support body. If the external diameter of the circumferential external ribs with relation to the external diameter of the base area of the support body is within the stated range, sufficient tightness of the pipe connection according to the invention is ensured with low material consumption for the circumferential external ribs. In this regard, the external diameter of the circumferential external ribs is particularly preferred 1.05 times to 1.2 times the external diameter of the base area of the support body, in particular 1.07 times to 1.1 times the external diameter of the base area of the support body. The external diameter of a circumferential external rib with a saw-tooth-shaped cross section preferably corresponds to the external diameter of a circumferential external rib with rectangular cross section.

It can also be useful if the width of at least one of the circumferential external ribs with a substantially rectangular cross section is 0.01 to 0.08 times, particularly preferably 0.02 to 0.06 times, the length of the support body. If the width of the circumferential external ribs is within the stated range, the circumferential external ribs of the connecting element can slide far enough with sufficient sealing effect into the end of the pipe press-fitted onto the support body as to ensure a secure fit of the end of the pipe on the support body of the connecting element.

It can also be helpful if the distance between two adjacent circumferential external ribs, measured from its edge facing the circumferential collar in each case, equals 0.10 times to 0.50 times the length of the support body. A distance between two adjacent circumferential external ribs within the stated range allows the circumferential external ribs of the connecting element to press into the end of the pipe press-fitted onto the pipe connection section, wherein the distance determines a desired distribution of a preferred number (in particular three or four) of circumferential external ribs on the support body of the connecting element.

It can also turn out to be favourable if the connecting elements of the pipe connection according to the present invention further comprises at least one circumferential collar. The circumferential collar provides a secure grip of a tool for attaching the fixing sleeve onto the pipe end, in which the support body of the collecting element is inserted. According to the present invention it is preferred if the external diameter of the circumferential collar is 1.1 times to 2.0 times, in particular 1.1 times to 1.8 times, and preferably 1.2 times to 1.5 times the external diameter of the circumferential external rib with the largest external diameter. If the external diameter of the circumferential collar is within this range, the risk of the press-fit tool slipping off the circumferential collar during press-fitting is low, thereby maintaining the resistance of the circumferential collar.

It can also be useful if the width of the circumferential collar equals 0.050 times to 0.20 times the length of the support body, in particular 0.060 times to 0.15 times the length of the support body and preferably 0.070 times to 0.11 times the length of the support body. A width of the circumferential collar offers sufficient force absorption when using the sliding sleeve tool with low material effort.

Likewise, it can be useful if the connecting element between the circumferential collar and its nearest circumferential rib to such circumferential collar further comprises at least one pre-stop that constitutes a limitation for sliding onto the end of the pipe. In this regard, it can be particularly favourable if the pipe connection further comprises a sliding sleeve, preferably made of an elastically deformable polymeric material, axially slid onto the expanded end of the pipe, wherein the end of the sliding sleeve facing the circumferential collar protrudes beyond the edge of the pre-stop facing the circumferential ribs. Such an arrangement favours a bend of the sliding sleeve made of an elastically deformable polymeric material in the final pipe connection at the side of the support body facing the circumferential collar towards the support body. The pre-stop between the circumferential collar and its nearest circumferential rib constitutes a limitation for sliding onto the expanded end of the pipe in axial direction. Thereby, a hollow space is formed between the pre-stop and the circumferential collar, which can accommodate the section of the sliding sleeve bent towards the support body. In this manner, the stability of the pipe connection according to the present invention is further increased.

The sliding sleeve is preferably adjusted to specific pipe versions (metal plastic composite, all-plastic or for specific expansion ratios). This concerns the geometry of the sleeve and/or the material used.

It can also prove helpful if the circumferential collar is connected with the pre-stop via a plurality of bridges. Such connecting bridges between the circumferential collar and the pre-stop provide the connecting element with additional stability, as the forces acting on the circumferential collar during the axial press-fitting of the sliding sleeve, which the corresponding sliding tool engages, are partially deflected to the pre-stop as well. In alternative embodiments of the present invention an even higher stability can also be achieved by configuring the pre-stop in a stepped arrangement to the circumferential collar as an integral component thereof.

Likewise, it can be useful if the distance between the edge of the pre-stop facing the circumferential external ribs and the edge of the circumferential collar facing the pre-stop is 0.10 times to 0.30 times the length of the support body, in particular 0.12 times to 0.25 times the length of the support body, and preferably 0.13 times to 0.20 times the length of the support body. A distance within this range has turned out to be sufficient for generating a bend of the sliding sleeve while generating the pipe connection of the present invention with a sliding sleeve, thereby maintaining the stability of the connecting element.

It might as well be favourable, if the external diameter of the pre-stop is 1.1 times to 1.5 times, preferably 1.15 times to 1.4 times and particularly preferred 1.2 times to 1.3 times the external diameter of the circumferential external rib with the largest diameter. With an external diameter of the pre-stop within the stated range, the pre-stop constitutes a sufficiently large obstacle for the pipe during axially sliding onto of the sliding sleeve. A pre-stop with too large an external diameter outside the stated range would mean that the sliding sleeve in the sliding sleeve connection could attach itself to the pre-stop, thus not increasing the stability of the sliding sleeve connection and possibly deteriorate it instead.

It can also be preferred if the distance between the pre-stop of the connecting element and the nearest circumferential external rib to the latter equals 0.10 to 0.50 times, particularly preferred 0.20 times to 0.36 times the length of the support body. With such a configuration of the distance between the pre-stop of the connecting element and a nearest circumferential external rib to the latter, a region of the support body is created in which the end of the pipe press-fitted onto the support body can partially accommodate the form of the bend of the sliding sleeve in the sliding sleeve connection according to the invention, thus further increasing the stability of the pipe connection according to the invention.

It can also be helpful if the ratio of the height of the pre-stop to the wall thickness of the pipe ranges from 0.40 to 1.0, in particular from 0.50 to 0.98, and preferably from 0.60 to 0.96. A relative height of the pre-stop enables pipes with different wall thicknesses to be used in the pipe connection according to the present invention with a sliding sleeve.

Likewise, it can be advantageous if the length of the support body is 0.60 times to 2.0 times, in particular 0.90 times to 1.8 times, and preferably 1.1 times to 1.5 times the external diameter of the circumferential external rib with the largest diameter. If the length of the support body is within the stated range, the connecting element has good resilience to bending stress with reasonable material effort.

It is also preferred if the internal surface of the sliding sleeve has an average roughness value $R_a$ ranging from 1 µm to half of the average wall thickness of the sliding sleeve. An increased roughness on the internal surface of the sliding sleeve, compared with the smooth internal surfaces of sliding sleeves for axial press-fit systems previously used according to the prior art, leads to a reduction in the force needing to be exerted for axially-sliding the corresponding sliding sleeve onto the expanded end of the pipe with inserted support body. At the same time, an internal surface of the sliding sleeve with increased roughness is accompanied by a lower tendency to relative motion of the sliding sleeve on the expanded end of the pipe, in particular in the event of thermal cycling. These two significant advantages of the rough internal surface of the sliding sleeve are to be observed as of an average roughness value $R_a$ of the internal surface of the sliding sleeve of 1 µm. If this average roughness value $R_a$ of the internal surface of the sliding sleeve exceeds half of the average wall thickness of the sliding sleeve, it may occur that the sliding sleeve does not exert sufficient pressure on the expanded end of the pipe with the inserted support body of the connecting element. This could lead to a less tight sliding sleeve connection. It can be advantageous in this regard if the internal surface of the sliding sleeve has an average roughness value $R_a$ ranging from 3 µm to 1000 µm, preferably from 5 µm to 50 µm. The stated ranges of the average roughness value achieve a particularly well-balanced ratio between reduced force to be exerted for press-fitting and sufficient stability of the resulting sliding sleeve connection according to the invention. The term "average roughness value" (designated by the symbol "$R_a$") of a surface, as used herein, means the arithmetic average or mean of the amount deviation of all measuring points on the surface from the centre line of the surface. Such effects can be alternatively or additionally increased or achieved if the internal surface of the sliding sleeve has a plurality of macroscopic irregularities, the depth of which does not exceed half of the medium wall thickness of the sliding sleeve.

Likewise, it can be advantageous according to the invention if the internal surface of the sliding sleeve has an average roughness depth $R_z$ ranging from 5 µm to half of the average wall thickness of the sliding sleeve, preferably ranging from 10 µm to 2000 µm. The stated ranges of the average roughness depth result in a well-balanced ratio between reduced force to be exerted for press-fitting and sufficient intrinsic elasticity of the sliding sleeve. The term "average roughness depth" (designated by the symbol "$R_z$") of a surface means the roughness depth according to DIN EN ISO 4287/4288.

It can also be of advantage if the pipe is an all-plastic pipe and the sliding sleeve is made of crosslinked polyethylene (PE-X, in particular PE-Xa, PE-Xb and PE-Xc). In the case of an all-plastic pipe, a sliding sleeve is made of crosslinked polyethylene exerts a sufficiently strong force towards the external side of the pipe for forming a stable pipe connection of the present invention.

It might also be preferred if, the pipe concerned is a metal-plastic composite pipe and the sliding sleeve is made of polyvinylidene fluoride (PVDF). Preferably, a metal-plastic composite pipe is not expanded too widely in order to ensure the integrity of the metal layer. Therefore, it is favourable in such a case to use a sliding sleeve made of PVDF, which exerts a stronger force towards the external side of the pipe as compared to a sliding sleeve made of crosslinked polyethylene. Thereby, a stable pipe connection of the present invention is formed.

It can also be useful if the expansion ratio of the pipe connection is within a range 0.15 to 0.35 and the sliding sleeve is made of crosslinked polyethylene. With such a strong expansion of the pipe, the pipe itself already exerts a strong pressing force to the connecting element in the pipe connection of the present invention. Thus, it is sufficient to use a sliding sleeve made of cost-efficient crosslinked polyethylene which exerts a weaker force towards the external side of the pipe, for forming a stable pipe connection of the present invention. To the contrary, in the case of a low expansion ratio of the pipe connection in the range of 0.05 to 0.20, it is preferred to use a sliding sleeve made of polyvinylidene fluoride (PVDF), which exerts a stronger force towards the external side of the pipe compared to a sliding sleeve made of crosslinked polyethylene and, thus, further stabilizes the pipe connection of the present invention.

According to the present invention, preferred materials for the connecting element of the present invention are polymeric materials, such as, for example, polypropylene and glass fibre reinforced polypropylene, polyamides and glass fibre reinforced polyamides, temperature-resistant thermoplastics such as polyphenyl sulfone (PPSU), polyvinylidene fluoride (PVDF), polyether sulfone (PES), polyphenylene sulfide (PPS), polysulfone (PSU), acrylonitrile-butadiene-styrene (ABS) and polyester carbonate (PESC), as well as copolymers and blends of such polymers, wherein said polymer materials can also be used fibre reinforced, in particular glass fibre reinforced, as well as metallic materials, such as, for example, brass, in particular Ecobrass®, red brass and stainless steel. Temperature-resistant thermoplastics, such as polyphenyl sulfone and polyvinyl fluoride, are particularly preferred for producing the connecting element used according to the invention. The term "temperature-resistant thermoplastics", as used herein, relates to the heat resistance and thermostability of this material group and designates thermoplastic polymer materials with a heat resistance at temperatures of at least 150° C. The upper limit of the temperature at which such temperature-resistant plastic can be used depends on the material used, wherein the usability of such polymer materials ends at a maximum of 260° C.

According to the present invention, used as plastic pipes are all-plastic pipes, preferably made of polyethylene (PE, in particular PE 100 and PE-RT, crosslinked polyethylene (PE-X, in particular PE-Xa, PE-Xb and PE-Xc), polypropylene (in particular statistical polypropylene PP-R) and polybutylene (PB); as well as plastic composite pipes, preferably with layers of polyethylene (PE, in particular PE 100 and PE-RT), crosslinked polyethylene (PE-X, in particular PE-Xa, PE-Xb and PE-Xc), polypropylene (in particular statistical polypropylene PP-R) and/or polybutylene (PB). An additional layer of ethylene vinyl alcohol copolymer (EVOH) may also be provided as oxygen barrier layer. According to the present invention, metal-plastic composite pipes (MCV pipes) preferably comprise layers of polyethylene (PE, in particular PE 100 and PE-RT), crosslinked polyethylene (PE-X, in particular PE-Xa, PE-Xb and PE-Xc), polypropylene (in particular statistical polypropylene PP-R) and/or polybutylene (PB) and at least one layer of metals, preferably aluminium. Preferably, the metal layers are butt welded. When using plastic composite pipes and MCV pipes, bonding agent layers may also be inserted in between individual layers. According to the present invention, all pipes in a pipe connection can be constructed identically or one or more of the pipes can have different structures. In addition, the pipes can also be fibre reinforced according to the present invention. The fibre reinforcement of the line pipes can be present in individual or all pipes, over the entire length of the pipe or only in sections as well. With regard to the plastic pipe or the metal-plastic composite pipe of the sliding sleeve connection according to the present invention, it is particularly preferable if at least one layer of the respective pipe includes crosslinked polyethylene (PE-X, in particular PE-Xa, PE-Xb and PE-Xc). The material "crosslinked polyethylene" is a material that has a shape memory, a so-called "memory effect". Such a memory effect means that the cross-linked polyethylene tries to return to its original shape after any change in its external geometry. During pipe expansion, this causes any pipe including PE-X to try to return to the original internal pipe diameter before the expansion. As a support body of a connecting element is inserted into the expanded end of the pipe after expansion, the memory effect when using a pipe including at least one layer of crosslinked polyethylene leads to a particularly high tightness of the sliding sleeve connection according to the invention.

The connecting element of the pipe connection according to the present invention can be a threaded moulded part or a threadless moulded part, i.e. a connecting element with no thread. This in particular includes connecting pieces, connection brackets, multiple distributors, t-pieces, wall t-pieces, wall brackets, system transitions, transition pieces, angled transition pieces, none of which have a thread. Accordingly, the term "threaded moulded part" refers to a connecting element having at least one threaded moulded part. This in particular includes connecting pieces, connection brackets, multiple distributors, t-pieces, wall t-pieces, wall brackets, system transitions, transition pieces and angled transition pieces, all of which have at least one internal and/or external thread.

According to the present invention, it has turned out to be favourable if the of the pipe connection according to the present invention is an axial press-fitting connection with a sliding sleeve. For this purpose, the preferred materials for the sliding sleeve are those materials to which reference is made with relation to the connecting element of the pipe connection according to the present invention. Temperature-resistant plastics and in particular polyphenyl sulfone and polyvinylidene fluoride are particularly preferred as materials for the sliding sleeve. Cross-linked polyethylene (PE-X, in particular PE-Xa, PE-Xb and PE-Xc) is also particularly preferred as material for the sliding sleeve. Particularly preferred, both the material and the geometry of the sliding sleeve may vary depending on the construction and the wall thickness of the pipe when used together with the connecting element as described herein.

The pipe connection according to the present invention is in particular used in piping and connection systems in drinking water installation, in sprinkler systems, in radiator connections, in concrete core temperature controls as well as in surface heating or surface cooling systems.

BRIEF DESCRIPTION OF THE DRAWINGS

The following is intended to explain the invention in detail with reference to the embodiments shown in the figures. The figures show in.

DETAILED DESCRIPTION OF THE DRAWINGS

Figure 1:
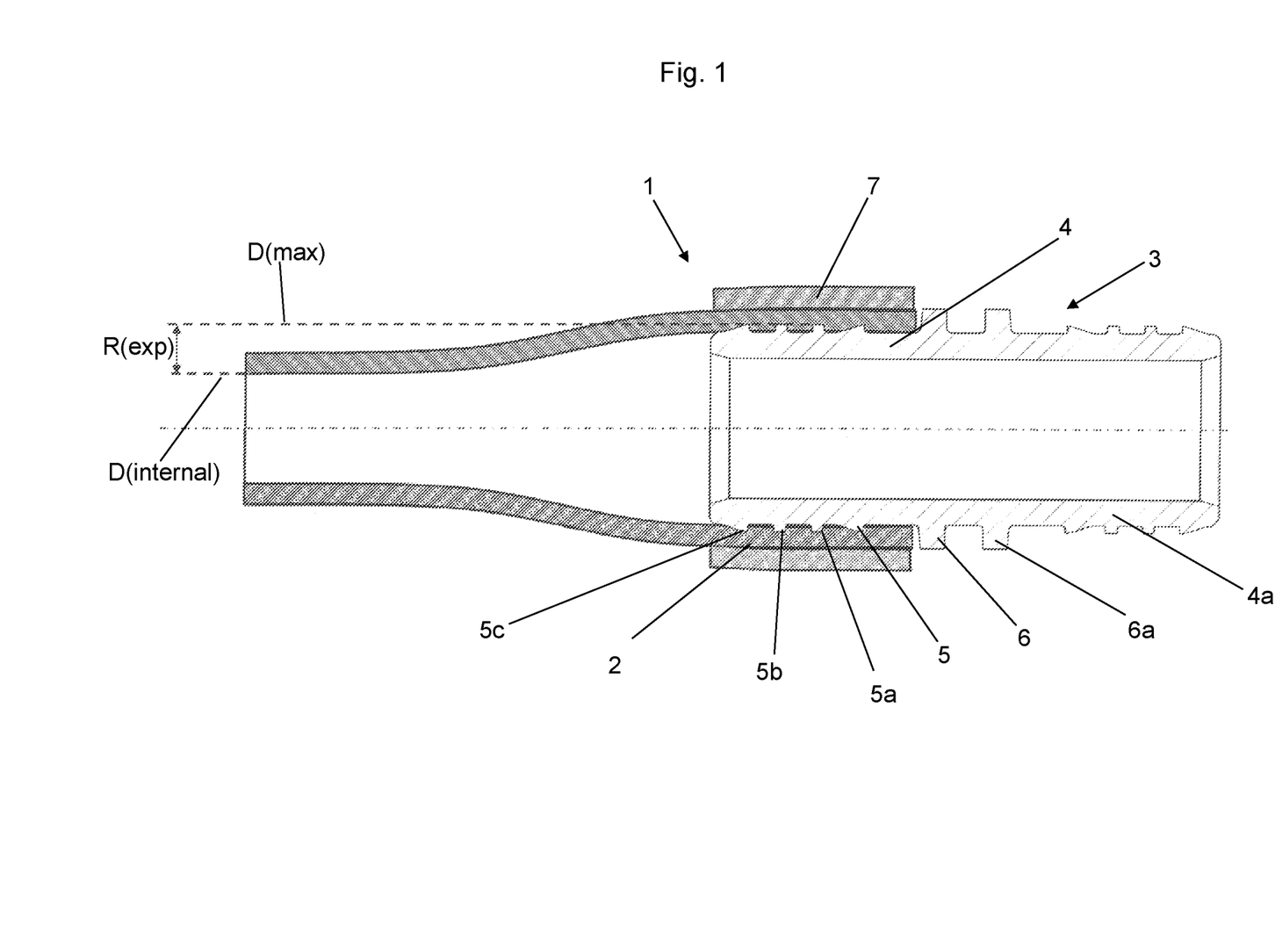
FIG. 1 a cross sectional view of a pipe connection according to an embodiment of the present invention, in which a plastic pipe is slid onto a support body of the connecting element.

FIG. 1 shows a cross sectional view of an embodiment of a pipe connection 1 according to the present invention. Therein, the pipe connection comprises an end of a plastic pipe 2 and a connecting element 3.

The connecting element 3 is a connecting piece having two support bodies 4, 4a, wherein an end of a plastic pipe 2 is slid on one support body 4 only. Each of the support bodies 4, 4a has four circumferential external ribs 5, 5a, 5b, 5c, wherein said four circumferential external ribs 5, 5a, 5b, 5c are arranged in an axial direction, beginning at the end of the connecting element 3, in such a way that a saw-tooth-shaped circumferential external rib 5c is followed by two consecutive circumferential external ribs 5b, 5a having a substantially rectangular cross section, which are in turn followed by a further saw-tooth-shaped circumferential external rib 5. Furthermore, the connecting element 3 comprises a circumferential collar 6, 6a for each support body 4, 4a, closing off the respective support body 4, 4a.

In the embodiment shown in FIG. 1, the connecting element 3 is a component made of polyphenyl sulfone (PPSU). Also usable in alternative embodiments of the connecting element 3 are polypropylene and glass fibre reinforced polypropylene, polyamides and glass fibre reinforced polyamides, polyvinylidene fluoride (PVDF), polyether sulfone (PES), polysulfone (PSU), polyphenyl sulphide (PPS), and polyester carbonate (PESC), as well as copolymers and blends of said polymers, wherein said polymer materials can also be used fibre reinforced, in particular glass fibre reinforced, or metallic materials, such as brass, in particular Ecobrass®, red brass and stainless steel.

Pipe 2 according to this embodiment of the present invention is an all-plastic pipe 2 made of crosslinked polyethylene (PE-X, in particular PE-Xa, PE-Xb and PE-Xc). As an alternative, all-plastic pipes made of other materials as well as plastic composite pipes and metal-plastic composite pipes can also be used as pipe 2 in other embodiments of the present invention. Preferred, however, when using plastic composite pipes and metal-plastic composite pipes is a layer of crosslinked polyethylene (PE-X), in particular PE-Xa, PE-Xb and PE-Xc as the layer facing the internal diameter of pipe 2.

A further pipe 2 can be connected to the second support body 4a to the pipe connection 1 according to the invention. The further pipe 2 can have an identical or different construction to the pipe 2 of the support body 4.

In the embodiment shown in FIG. 1, the pipe connection of the present invention comprises a fixing sleeve 7 for fixing the end of the pipe 2 onto the support body 4, which fixing sleeve is preferably an axial sliding sleeve. In the embodiment shown, the sliding sleeve 7 is a sleeve made of crosslinked polyethylene (PE-X, in particular PE-Xa, PE-Xb and PE-Xc), which has a constant cross section over its entire length. Alternatively, sliding sleeves 7 made of other materials, in particular polyvinylidene fluoride (PVDF), can also be advantageously used.

In order to generate the pipe connection 1 according to the present invention, the sliding sleeve 7 is initially slid over the end of the plastic pipe 2. An expansion tool is then inserted into the end of the plastic pipe 2 and the plastic pipe 2 is expanded at one end by means of an expansion tool. Thereupon, the support body 4 of the connecting element 3 is inserted in the expanded end of the plastic pipe 2 until the expanded end of the plastic pipe 2 is approximately attached to the circumferential collar 6. The expanded end of the plastic pipe 2 contracts due to the memory effect of the pipe material, wherein the plastic material of the plastic pipe 2 presses into the external contour of the support body 4 of the connecting element 3. The sliding sleeve 7 is finally slid in an axial direction onto the end of the plastic pipe 2 with inserted support body 4 by a suitable press-fit tool in such a way that the end of the plastic pipe 2 is fixed on the support body 4. Further plastic pipes 2 or metal-plastic composite pipes 2 may now be connected in the same way to the further support body 4a.

In the embodiment shown in FIG. 1, the expansion ratio is approximately 0.23. This value is particularly preferred for a pipe connection between a connecting element 3 and a plastic pipe 3, while a value of approximately 0.15 is particularly preferred for a connection between a connecting element 3 and a metal plastic composite pipe 2.

Figure 2:
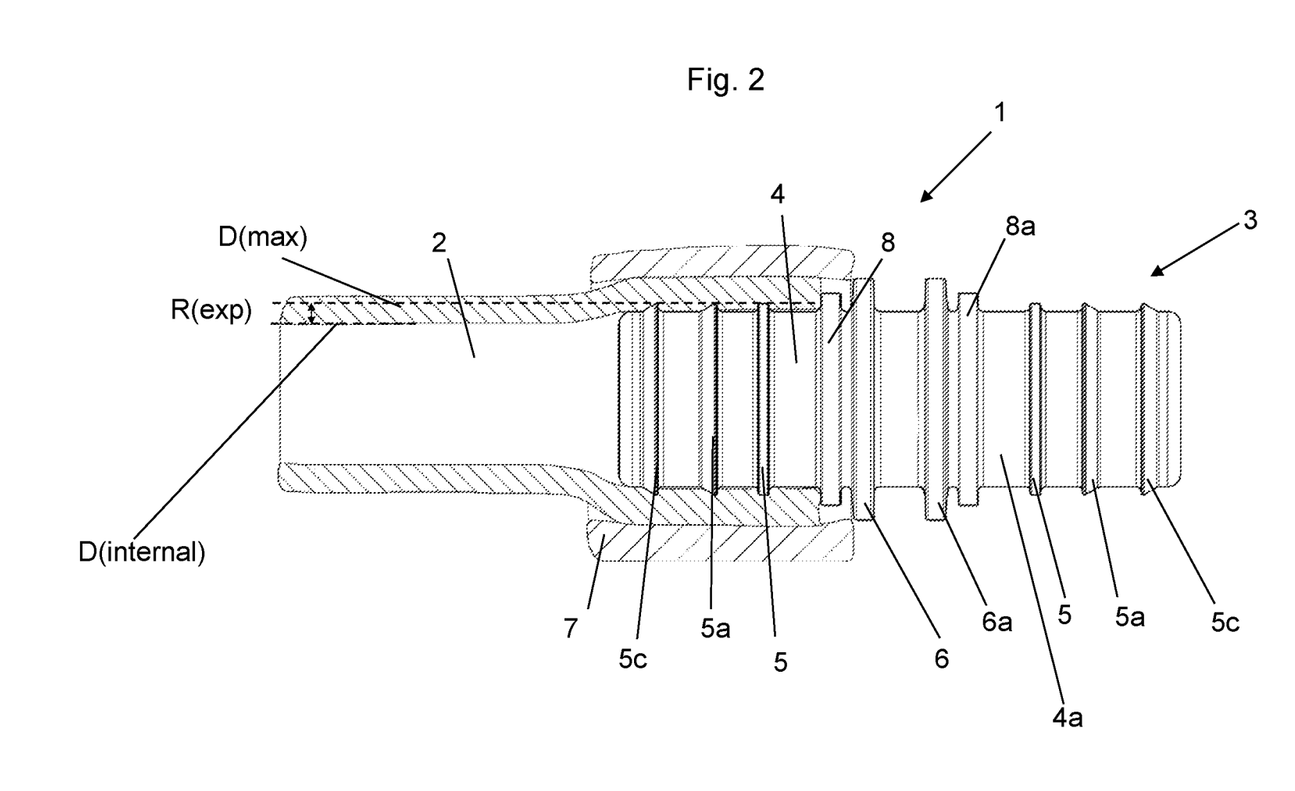
FIG. 2 is a side view of a pipe connection according to a further embodiment of the present invention, in which a plastic pipe is slid onto a support body of the connecting element illustrated in FIG. 1, wherein the end of the pipe and the sliding sleeve are shown in section.

FIG. 2 shows a further embodiment of a pipe connection 1 according to the present invention in a side view, wherein pipe 2 and sliding sleeve 7 are shown in section.

Also in the embodiment shown in FIG. 2, the pipe connection 1 according to the present invention comprises a connecting element 3, a pipe 2 and a sliding sleeve 7. The connecting element 3 is also a connecting piece having two support bodies 4, 4a, wherein each of the support bodies 4, 4a has three circumferential external ribs 5, 5a, 5c in the embodiment shown in FIG. 2. These three circumferential external ribs 5, 5a, 5c extend in an axial direction and are arranged, beginning at the open end of the connecting element 3, in such a way that two consecutive saw-tooth-shaped circumferential external ribs 5c, 5a are followed by one circumferential external rib 5 having a substantially rectangular cross section. At each of the two support bodies 4, 4a, a pre-stop 8, 8a follows. Furthermore, the connecting element 3 has a circumferential collar 6, 6a for each support body 4, 4a, which closes off the respective support body 4, 4a.

The geometry of the connecting element 3 and the pipe connection 1 according to the present invention are described in detail in the following with reference to the left support body 4 in FIG. 2, wherein it is understood that such explanations also apply to the right support body 4a in FIG. 2 as well as to further existing support bodies possibly present in other embodiments accordingly.

According to the embodiment shown in FIG. 2, the sliding sleeve 7, shown in a sectional view in FIG. 2, is slid therein beyond the expanded end of the all-plastic or metal-plastic composite pipe 2 slid onto support body 4 and extending to the pre-stop 8 as a maximum, said pipe 2 also being shown in sectional view in FIG. 2, in the direction of the circumferential collar 6 of the connecting element 3. As the pre-stop 8 is spaced from the circumferential collar 6, a hollow space is formed between the pre-stop 8 and the circumferential collar 6. Said hollow space allows a bending of the section of the sliding sleeve 7 protruding beyond the end of the pipe in the direction of the support body 4. This results in a mechanical fixing of the sliding sleeve 7 and thus an increased stability of the pipe connection 1 according to the present invention. In the embodiment of the connecting element 3 shown in FIG. 2, the distance between the circumferential collar 6 of the connecting element 3 and the associated pre-stop 8 is 0.20 times the length of the support body 4. In alternative embodiments of the connecting piece 3 the distance between the pre-stop 8 and the circumferential collar 6 can equal 0.10 times to 0.30 times the length of the support body 4. As used herein, the term "length of the support body 4" in each case refers to the distance between the open end of the support body 4 of the connecting element 3 and the circumferential collar 6. The external diameter of the pre-stop 8 in the shown embodiment of the connecting element 3 is 1.25 times the external diameter of the circumferential external ribs 5, 5a, 5c. In alternative embodiments the external diameter of the pre-stop 8 can equal 1.1 times to 1.5 times the external diameter of the circumferential external rib 5, 5a, 5c with the largest external diameter. If the external diameter of the pre-stop 8 is within the stated range, the pre-stop 8 constitutes a sufficiently large obstacle for the expanded end of the pipe 2 without impairing the stability of the pipe connection 1 according to the present invention. In the embodiment shown the ratio of the height of the pre-stop 8 over the base area of the support body 4 to the wall thickness of the all-plastic or metal plastic composite pipe 2 is 0.75 and preferably ranges from 0.40 to 1.5.

In the embodiment of the connecting element 3 shown in FIG. 2 the distance between pre-stop 8 of the connecting element 3 and the nearest circumferential external rib 5 to the latter is 0.18 times the length of the support body 4. This allows the sliding sleeve 7 in the pipe connection 1 of the present invention to be pushed more strongly into the expanded end of the pipe 2 of the all-plastic or metal-plastic composite pipe slid onto the support body 4 than via the section at which the circumferential external ribs 5, 5a, 5c are arranged. This results in further increased stability of the pipe connection 1 according to the present invention. In alternative embodiments of the connecting piece 3 the distance between the pre-stop 8 and the nearest circumferential external rib 5 to the latter can be 0.10 times to 0.50 times the length of the support body 4. The wall thickness or width of the circumferential collar 6 equals 0.11 times the length of the support body 4, wherein in alternative embodiments of the connecting piece 3 the width of the circumferential collar 6 can be 0.050 times to 0.20 times the length of the support body 4.

The external diameter of the circumferential collar 6 is 1.4 times the external diameter of the circumferential external ribs 5, 5a, 5c, which have the same maximum external diameter in the embodiment shown. The risk of the press-fit tool slipping off the circumferential collar 6 during pressing is thus low, thereby the resistance of the circumferential collar 6 is maintained. In alternative embodiments of the connecting piece 3 the external diameter of the circumferential collar 6 is 1.0 times to 2.0 times the external diameter of the circumferential external rib 5, 5a, 5c with the largest external diameter. The length of the support body 4 is 1.4 times the external diameter of the circumferential external ribs 5, 5a, 5c, wherein in alternative embodiments of the connecting piece 3 the length of the support body 4 is 0.60 times to 2.0 times the external diameter of the circumferential external rib 5, 5a, 5c with the largest external diameter. The connecting element 3 thus has good resilience to bending stress with reasonable material expense. The external diameter of the circumferential external ribs 5, 5a, 5c measures 1.1 times the external diameter of the base area of the support body 4. This allows the circumferential external ribs 5, 5a, 5c of the connecting element 3 in a pipe connection 1 according to the present invention to be pushed far enough into the end of the pipe 2 slid onto the support body 4 to ensure a secure and tight fit of the end of the pipe 2 on the support body 4 with reasonable material expense. In alternative embodiments of the connecting element 3 the maximum external diameter of the circumferential external ribs 5, 5a, 5c is 1.03 to 1.3 times the external diameter of the base area of the support body 4. Here, the circumferential external ribs 5, 5a, 5c can have differing external diameters, although it is preferred that the circumferential external ribs 5, 5a, 5c have the same external diameter. The distance between the edges facing the collar of the two saw-tooth-shaped circumferential external ribs 5a, 5c is 0.25 times the length of the support body 4, while the distance between the saw-tooth-shaped circumferential external rib 5a and circumferential external rib 5 with a substantially rectangular cross section is 0.2 times the length of the support body 4, always measured from the edges facing the circumferential collar. This allows the circumferential external ribs 5, 5a, 5c of the connecting element 3 to be pressed far enough into the pipe end press-fitted onto the support body 4 to ensure a securely fitting seal. However, it is preferred if the three circumferential external ribs 5, 5a, 5c are distributed as equally as possible on the corresponding section of the support body 4. These advantages allow the distance between two circumferential external ribs 5, 5a, 5c in alternative embodiments of the connecting element 3 to equal 0.10 times to 0.50 times the length of the supporting body 4 as well.

The connecting element 3 shown in FIG. 1 is designed in mirror symmetry to a level running down the middle between the two circumferential collars 6, 6a and perpendicularly to the axis of the connecting element 3. Accordingly, the comments made with reference to the support body 4 thus apply analogously to support body 4a.

In the embodiment shown in FIG. 2, the connecting element 3 is a component made of Polyphenyl sulphone (PPSU). In alternative embodiments of the connecting element 3 also polypropylene, glass fibre reinforced polypropylene, polyamides, glass fibre reinforced polyamides, polyvinylidene fluoride (PVDF), polysulfone (PSU), polyether sulfone (PES), polyphenylene sulfide (PPS), acrylonitrile-butadiene-styrene (ABS) and polyester carbonate (PESC) as well as copolymers and blends of such polymers, wherein said polymer materials can also be used fibre reinforced, in particular glass fibre reinforced, as well as metallic materials, such as brass, in particular Ecobrass®, red brass and stainless steel, can be used.

According to this embodiment of the present invention the pipe 2 is an all-plastic pipe 2 made of crosslinked polyethylene (PE-X, in particular PE-Xa, PE-Xb and PE-Xc). As an alternative, all-plastic pipes made of other materials as well as plastic composite pipes and metal-plastic composite pipes can also be used as pipe 2 in other embodiments of the present invention. Preferred, however, when using plastic composite pipes and metal-plastic composite pipes is a layer of crosslinked polyethylene (PE-X), in particular PE-Xa, PE-Xb and PE-Xc as the layer facing the internal diameter of pipe 2.

A further pipe 2 can be connected to the second support body 4a by a pipe connection 1 according to the present invention. The further pipe 2 can have an identical or different construction to the pipe 2 at the support body 4.

The sliding sleeve 7 used for fixing the expanded end of the pipe 2 onto the support body 4, is a sleeve made of crosslinked polyethylene (PE-X, in particular PE-Xa, PE-Xb and PE-Xc), which has a constant cross section over its entire length. Alternatively, sliding sleeves 7 made of other materials, in particular polyvinylidene fluoride (PVDF), can also be advantageously used. The sliding sleeve 7 in this embodiment has an internal surface with an average roughness value $R_a$ in a range of 4 μm, wherein the roughness of the internal surface in alternative embodiments of the sliding sleeve 7 preferably ranges from 1 μm to half of the average wall thickness of the sliding sleeve 7. An increased roughness on the internal surface of the sliding sleeve 7, compared with sliding sleeves with smooth internal surfaces, leads to a reduction in the force needing to be exerted for axially sliding the corresponding sliding sleeve 7 onto the expanded end of the pipe 2 with inserted support body 4. At the same time, an internal surface of the sliding sleeve 7 with increased roughness has a lower tendency to relative motion of the sliding sleeve 7 on the expanded pipe end, in particular in the event of thermal cycling.

In order to generate the pipe connection 1 according to the present invention, the sliding sleeve 7 is initially slid over the end of the plastic pipe 2. An expansion tool is then inserted into the end of the plastic pipe 2 and the plastic pipe 2 is expanded at one end by means of an expansion tool. Thereupon, the support body 4 of the connecting element 3 is inserted in the expanded end of the plastic pipe 2 until the expanded end of the plastic pipe 2 is approximately attached to the pre-stop 8. The expanded end of the plastic pipe 2 contracts due to the memory effect of the pipe material, wherein the plastic material of the plastic pipe 2 presses into the external contour of the support body 4 of the connecting element 3. The sliding sleeve 7 is finally slid in an axial direction onto the end of the plastic pipe 2 with inserted support body 4 by a suitable press-fit tool in such a way that the end of the plastic pipe 2 is fixed on the support body 4. Further plastic pipes 2 or metal-plastic composite pipes 2 may now be connected in the same way to the further support body 4a, thereby forming a pipe connection 1 of the present invention.

In the embodiment shown in FIG. 2, the expansion ratio is approximately 0.25. This value is particularly preferred for a pipe connection 1 between a connecting element 3 and an all-plastic pipe 2, whereas a value of approximately 0.15 is particularly preferred for a connection between a connecting element and a metal plastic composite pipe 2.

The present invention has been described in detail with reference to the embodiments of the present invention shown in the figures. It is understood that the present invention is not limited to the embodiments shown, but that the scope of the present invention results from the attached claims.

The invention claimed is:

1. Pipe connection, comprising at least one end of a plastic pipe or metal plastic composite pipe and one connecting element with at least one polymeric support body provided with circumferential ribs, onto which the end of the pipe is slid, wherein the plastic pipe or metal plastic composite pipe is made of or comprises at least a layer made of polyethylene selected from the group consisting of PE 100, PE-RT, and crosslinked polyethylene, and the following applies to the expansion ratio R(exp) of the pipe connection:

$$0.05 < R(exp) = [D(max)/D(internal)] - 1 < 0.35$$

wherein D(max) stands for the maximum external diameter of the circumferential ribs and D(internal) for the internal diameter of the pipe.

2. Pipe connection according to claim 1, wherein the pipe is a plastic pipe and the expansion ratio R(exp) of the pipe connection ranges from 0.10 to 0.35.

3. Pipe connection according to claim 1, wherein the pipe is a metal-plastic composite pipe and the expansion ratio R(exp) of the pipe connection ranges from 0.05 to 0.25.

4. Pipe connection according to claim 1, wherein at least one of the circumferential ribs has a saw tooth cross section and at least one of the circumferential ribs has a substantially rectangular cross section.

5. Pipe connection according to claim 1, wherein the external diameter of each circumferential rib independently equals 1.03 times to 1.3 times the external diameter of the base area of the support body.

6. Pipe connection according to claim 1, wherein the distance between the edges of two adjacent circumferential ribs facing the collar equals 0.10 times to 0.50 times the length of the at least one support body.

7. Pipe connection according to claim 1, wherein the connecting element further comprises at least one circumferential collar, the external diameter of the at least one circumferential collar being 1.1 to 2.0 times the external diameter of the circumferential rib with the largest external diameter.

8. Pipe connection according to claim 7, wherein the width of the at least one circumferential collar equals 0.050 times to 0.20 times the length of the supporting body.

9. Pipe connection according to claim 7, wherein the connecting element between the circumferential collar and its nearest circumferential rib to such circumferential collar further comprises at least one pre-stop that constitutes a limitation for sliding onto the end of the pipe.

10. Pipe connection according to claim 9, wherein the pipe connection further comprises a sliding sleeve axially slid onto the expanded end of the pipe, wherein the end of the sliding sleeve facing the circumferential collar protrudes beyond the edge of the pre-stop facing the circumferential ribs.

11. Pipe connection according to claim 9, wherein the circumferential collar is connected with the pre-stop via a plurality of bridges or the pre-stop is designed in a stepped arrangement to the circumferential collar as an integral component thereof.

12. Pipe connection according to claim 9, wherein the distance between the edge of the pre-stop facing the circumferential ribs and the edge of the circumferential collar facing the pre-stop equals 0.10 times to 0.30 times the length of the support body.

13. Pipe connection according to claim 9, wherein the external diameter of the pre-stop equals 1.1 times to 1.5 times the external diameter of the circumferential rib with the largest external diameter.

14. Pipe connection according to claim 9, wherein the distance between the pre-stop and the nearest circumferential rib to the pre-stop equals 0.10 times to 0.50 times the length of the support body.

15. Pipe connection according to claim 9, wherein the ratio of the height of the pre-stop to the wall thickness of the pipe ranges from 0.40 to 1.0.

16. Pipe connection according to claim 1, wherein the length of the support body equals 0.60 times to 2.0 times the external diameter of the circumferential rib with the largest external diameter.

17. Pipe connection according to claim 10, wherein the internal surface of the sliding sleeve has an average roughness value Ra in a range of 1 µm to half of the average wall thickness of the sliding sleeve.

18. Pipe connection according to claim 10, wherein the internal surface of the sliding sleeve has a plurality of macroscopic irregularities, the depth of which does not exceed half of the average wall thickness of the sliding sleeve.

19. Pipe connection according to claim 10, wherein the pipe is an all-plastic pipe and the sliding sleeve is made of crosslinked polyethylene (PE-X).

20. Pipe connection according to claim 10, wherein the pipe concerned is a metal-plastic composite pipe and the sliding sleeve is made of polyvinylidene fluoride (PVDF).

21. Pipe connection according to claim 10, wherein the expansion ratio R(exp) of the pipe connection ranges from 0.15 to 0.35 and the sliding sleeve is made of crosslinked polyethylene (PE-X).

22. Pipe connection according to claim 10, wherein the expansion ratio R(exp) of the pipe connection ranges from 0.05 to 0.20 and the sliding sleeve is made of polyvinylidene fluoride (PVDF).

23. Pipe connection according to claim 1, wherein the pipe is a plastic pipe and the expansion ratio R(exp) of the pipe connection ranges from 0.15 to 0.25.

24. Pipe connection according to claim 1, wherein the pipe is a metal-plastic composite pipe and the expansion ratio R(exp) of the pipe connection ranges from 0.10 to 0.20.

25. Pipe connection according to claim 9, wherein the ratio of the height of the pre-stop to the wall thickness of the pipe ranges from 0.50 to 0.98.

26. Pipe connection according to claim 1, wherein the plastic pipe or metal plastic composite pipe is made of or comprises a layer made of crosslinked polyethylene.

27. Pipe connection, comprising at least one end of a plastic pipe or metal plastic composite pipe, a connecting element with at least one support body provided with circumferential ribs, onto which the end of the pipe is slid, and a polymeric sliding sleeve axially slid onto the expanded end of the pipe, wherein the plastic pipe or metal plastic composite pipe is made of or comprises at least a layer made of polyethylene selected from the group consisting of PE 100, PE-RT, and crosslinked polyethylene, and the following applies to the expansion ratio R(exp) of the pipe connection:

$$0.05 < R(\exp) = [D(\max)/D(\text{internal})] - 1 < 0.35$$

wherein D(max) stands for the maximum external diameter of the circumferential ribs and D(internal) for the internal diameter of the pipe.

* * * * *